Feb. 6, 1951 J. A. DREYFUS 2,540,660

SOUND PRINTING MECHANISM

Filed Dec. 29, 1948 11 Sheets-Sheet 1

INVENTOR:
Jean Albert Dreyfus
BY Richards & Geier
ATTORNEYS

INVENTOR:
Jean Albert Dreyfus
By
Richardson Geier
ATTORNEYS

INVENTOR:
Jean Albert Dreyfus
BY
Richards & Geier
ATTORNEYS

INVENTOR:
Jean Albert Dreyfus
BY Richardson & Geier
ATTORNEYS

Fig.6
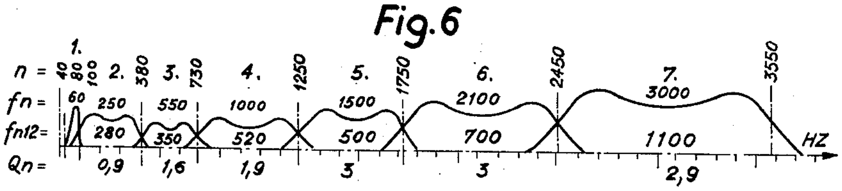
Fig.7
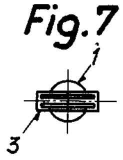
Fig.8
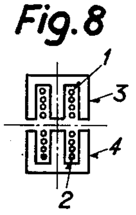
Fig.9
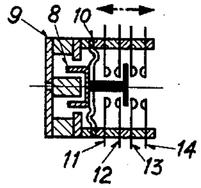
Fig.10
| | | | D | ou | ô | ŏ | æ | e | eu | u | ê | é | i | on | en | un | in | l | n | m | r | d | t | g | k | b | p | v | f | j | sch | z | s | h |
|---|---|---|---|---|---|---|---|---|---|---|---|---|---|---|---|---|---|---|---|---|---|---|---|---|---|---|---|---|---|---|---|---|---|---|
| 1 | 60 | 250 | 01 | | | | | | | | | | | | | | | | | | 01 | | 01 | | 01 | 01 | 01 | | 01 | | | | | |
| 2 | 250 | 550 | 12 | 12 | 21 | 21 | | | 12 | | | | | 21 | | | | | 12 | 12 | 21 | 12 | 12 | 12 | | 12 | 12 | 12 | | | | | | |
| 3 | " | 1000 | 13 | 13 | 13 | 31 | 31 | | | | 31 | 13 | | 13 | 31 | | | 13 | | | 31 | | | | | | | | | 13 | | | | |
| 4 | " | 1500 | 14 | | | | | | | 14 | | | | | 14 | 41 | 41 | | | | | | | | | | | | | | | | | |
| 5 | " | 2100 | 15 | | | | | | | | | | 15 | | | | | | 15 | 15 | | | | | | | | | | | 51 | | | |
| 6 | " | 3000 | 16 | | | | | | | | | | | | | | | | | | | | | | | | | | | | | 16 | 61 | |
| 7 | 550 | 1000 | 23 | | | | 32 | 23 | | | 23 | 23 | | | 32 | | | | | | | | | | | | | | | | | | | 32 |
| 8 | " | 1500 | 24 | | | | | | | | | | | | | 42 | 42 | 42 | 42 | 42 | | | | | | | | | | | | | | |
| 9 | " | 2100 | 25 | | | | | | | 52 | | | | 25 | | | | | | | | | | | | | | | | 52 | 52 | | | |
| 10 | " | 3000 | 26 | | | | | | | | | | 62 | | | | | 62 | | | | | | | | 62 | 62 | | | | | 62 | 62 | |
| 11 | 1000 | 1500 | 34 | 34 | 34 | 34 | 34 | 43 | 43 | | | | | | | | | | | | | | | | | | | | | | | | | |
| 12 | " | 2100 | 35 | | | | | | | 53 | | | | | | 35 | 53 | | 53 | 35 | 53 | | | | | | | 53 | 53 | | | | | 63 |
| 13 | " | 3000 | 36 | | | | | | | | | | | | | | | | 63 | 63 | | | | | 63 | 36 | 63 | 63 | 63 | | | | | 63 |
| 14 | 1500 | 2100 | 45 | | | | | 54 | 54 | | | | | | | | | | | | | 45 | 45 | 45 | 45 | | | | | 54 | 54 | | | |
| 15 | " | 3000 | 46 | | | | | | | | | | | | | | | | | | | 64 | 64 | 46 | 46 | | | | | | | | | |
| 16 | 2100 | 3000 | 56 | | | | | | | | 65 | 65 | 65 | | | | | | | | | | | | | | | | | 56 | 56 | | | |
Fig.11
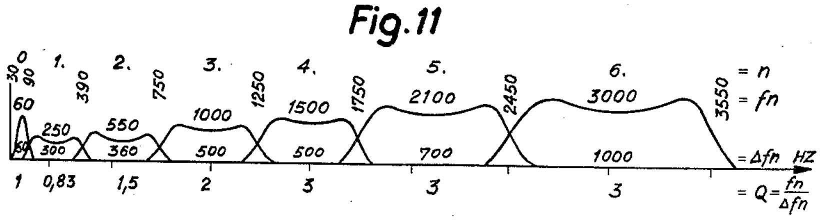
INVENTOR:
Jean Albert Dreyfus
BY
Richards & Geier
ATTORNEYS Feb. 6, 1951 J. A. DREYFUS 2,540,660

SOUND PRINTING MECHANISM

Filed Dec. 29, 1948 11 Sheets-Sheet 6

INVENTOR:
Jean Albert Dreyfus
BY
Richards & Geier
ATTORNEYS

SOUND PRINTING MECHANISM

INVENTOR:
Jean Albert Dreyfus
By

ATTORNEYS

| $L_{11}$ | $L_{21}$ | $L_{31}$ | $L_{41}$ | $L_{51}$ | $L_{61}$ | $L_{71}$ | |
|---|---|---|---|---|---|---|---|
| 20 | 6 | 2 | 1 | 0,8 | 0,7 | 0,6 | henry |
| $L_{n1} : L_{n2} = 1:4$ | | | | $3 < Q_L < 10$ | | | |

| | $R_{n3}$ | $C_{n3}$ | $R_{n5}$ | $C_{n5}$ | $C_{n7}$ | $R_{n13}$ |
|---|---|---|---|---|---|---|
| n > 1 | $5.10^4$ | $2.10^{-7}$ | $2.10^5$ | $5.10^{-8}$ | $5.10^{-8}$ | $10^6$ |
| n = 1 | $5.10^4$ | $10^{-7}$ | $2.10^5$ | $3.10^{-8}$ | $3.10^{-8}$ | $10^6$ |
| | ohm | farad | ohm | farad | ohm | farad |

INVENTOR:
Jean Albert Dreyfus
BY Richardson & Geier
ATTORNEYS

Feb. 6, 1951  J. A. DREYFUS  2,540,660

SOUND PRINTING MECHANISM

Filed Dec. 29, 1948  11 Sheets-Sheet 9

INVENTOR:
Jean Albert Dreyfus
BY Richards & Geier
ATTORNEYS

INVENTOR:
Jean Albert Dreyfus
BY
ATTORNEYS

Feb. 6, 1951 J. A. DREYFUS 2,540,660

SOUND PRINTING MECHANISM

Filed Dec. 29, 1948 11 Sheets-Sheet 11

INVENTOR:
Jean Albert Dreyfus
BY
Richards & Geier
ATTORNEYS

Patented Feb. 6, 1951 2,540,660

UNITED STATES PATENT OFFICE 2,540,660

SOUND PRINTING MECHANISM

Jean Albert Dreyfus, Geneva, Switzerland

Application December 29, 1948, Serial No. 67,900
In Switzerland January 8, 1948

26 Claims. (Cl. 178—31)

Various forms of electro-acoustic apparatus are known which break up the spectra of frequencies of microphonic oscillations into partial oscillations, the latter being rectified to furnish incomplete energy variations which operate electro-mechanical recorders, such as oscillographs or relays. These known forms of apparatus furnish indications of the energy components of sounds as a function of the frequency (spectrographs) or they may, in certain special conditions, operate relays as a function of the fixed energy components of certain sounds.

The known devices are not adapted to transform, for example, phonetic or phoneme (speech) elements (such as vowels and consonants) into graphic elements, such as alphabetic or codifiable symbols.

In effect, each sound in general and each phoneme in particular is a train of acoustic waves (a series of sinusoidal waves according to Fourier's theorem) which the hearing transforms into a sound image (a series of nervous impulses).

Physically the sound is presented at one time as a wave phenomenon in the air, at another time as a mechanical or corpuscular phenomenon in nerve fibres.

The apparatus according to the invention reproduces electro-mechanically certain physiological functions of the ear, of the nervous system, of the brain and of the muscles. It decomposes the frequency spectra of a microphonic oscillation (excited by a sound) into a number $n$ of partial oscillations with the aid of $n$ acoustic band filters, the mean frequencies of which are $f_n$ and the relative band widths $Q_n=f_n:\Delta f_n$ of which are of the same order of magnitude as of the relative band widths $Q^1_n$ of the resonators of the sound emitter. These partial oscillations are transformed into energy variations with the aid of rectifier circuits followed by low-pass filters, the time constants $T_n$ of which are of the same order of magnitude as the time constants $T^1_n$ of the transient parts of the emitted sound. Thereafter the differential effects of these energy variations are transformed into electrical impulses, of which certain combinations may operate two-dimensional oscillographs or relays.

In a general manner, the apparatus, according to the invention, can be called a "sonograph" from the Latin "sonus" equals "sound" and from the Greek "graph" equals "the action of writing." It permits certain types of sounds to be transformed into certain graphic types or into characteristic tele-controls or signals. When the sound type is that of phonemes the apparatus may be called a "phonetic sonograph." When the apparatus comprises a two-dimensional oscillograph it can be called a "steno-sonograph." When it comprises a typographical typewriter it can be called a "typo-sonograph."

The graphic products of the "sonograph" may be called "sonograms." The method may be described as "sonographic." The electrical impulses may be transmitted to a distance by wire or by electro-magnetic waves, while the apparatus according to the invention can transmit telegrams orally (tele- or radio-sonograms).

Figures 1 to 43 illustrate, by way of example, certain constructions according to the invention.

Figure 1 represents the spectra of the transient frequencies of the main phonetic elements or French phonemes. They permit the relative emitted band widths $Q^1_n$ to be deduced for a phonetic sonograph;

Figure 2 is a diagram showing the principle of a phonetic steno-sonograph with six components;

Figure 3 shows the pass bands corresponding to Figure 2;

Figure 4 is a diagram showing the principle of a theoretical typo-sonograph with four components;

Figure 5 is an electrical diagram of a sonograph with seven components, the bands of which are indicated by Figure 6;

Figures 7 and 8 show in elevation and section a transformer for a band filter;

Figure 9 is a section of an electro-dynamic relay;

Figure 10 is a table of combinations for a phonetic typo-sonograph with seven components, the bands of which are indicated in Figure 11;

Figure 12 is an electrical diagram of a typo-sonograph limited to the differentiation of five vowels;

Figure 5:
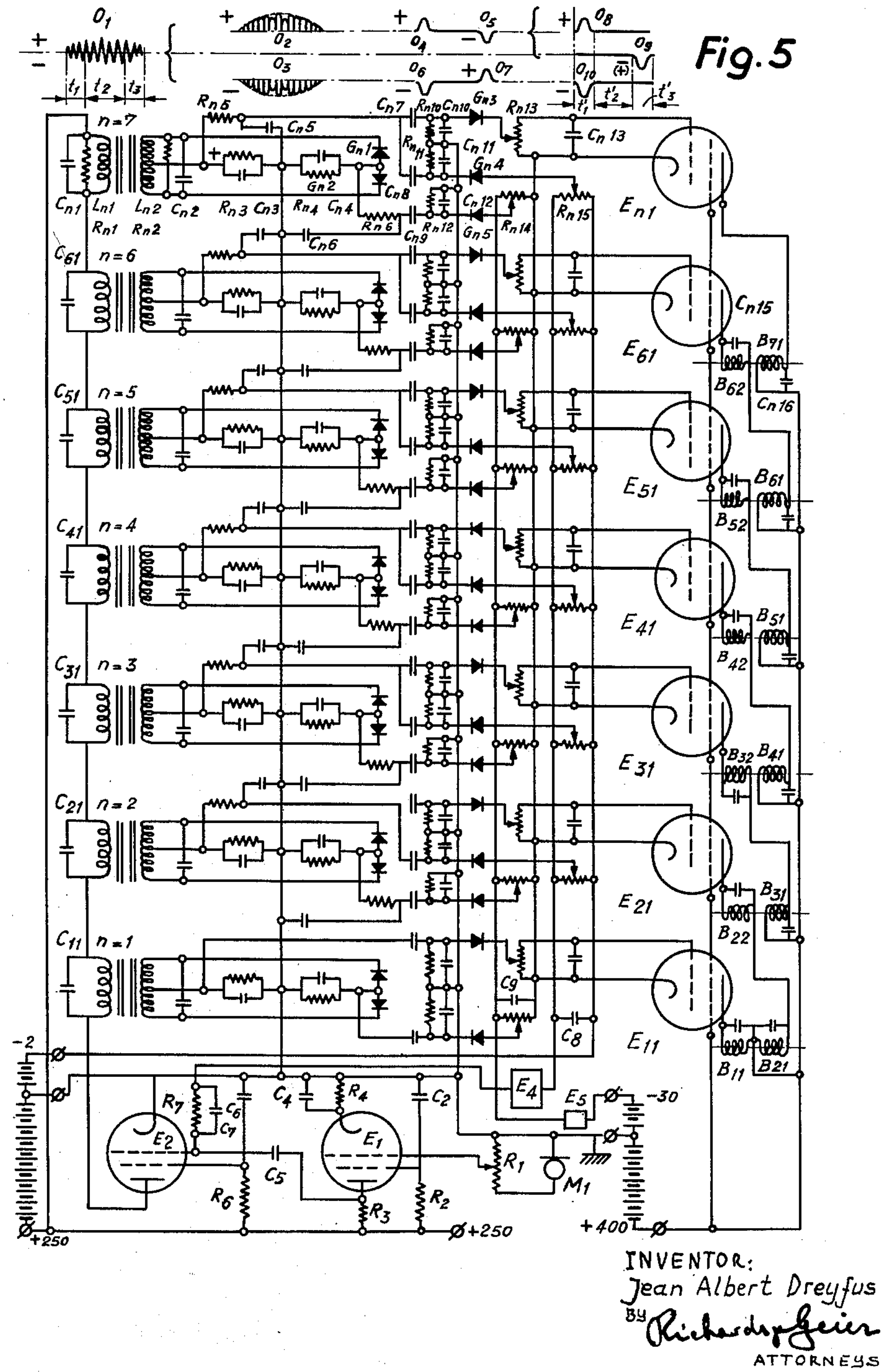
Figure 12:
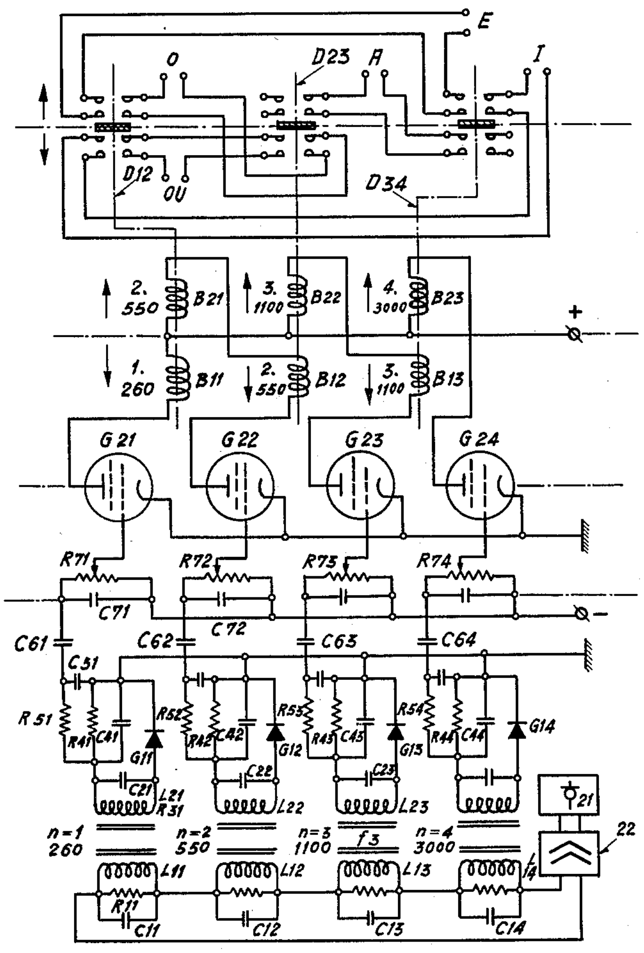
Figure 13:
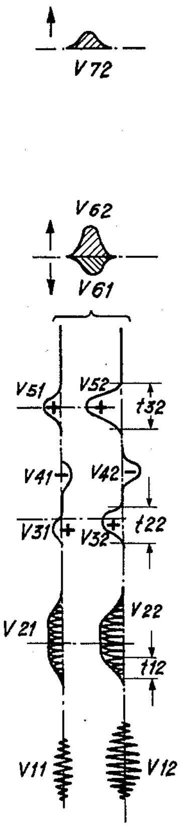
Figure 14:
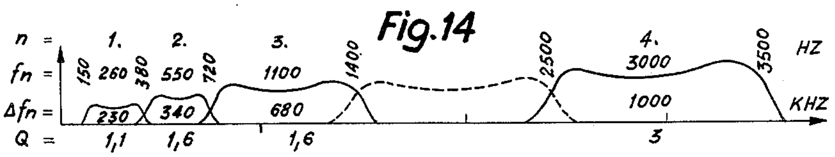
Figure 15:
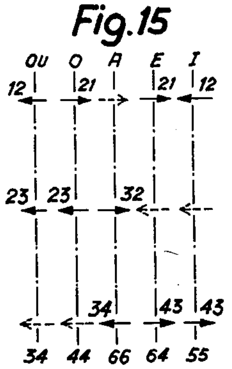
Figure 16:
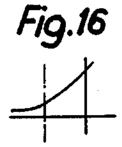
Figure 17:
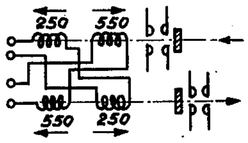
Figure 18:
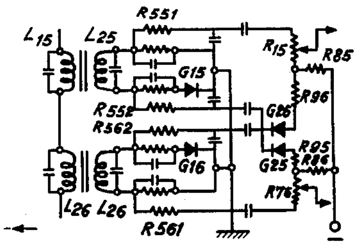
Figure 19:
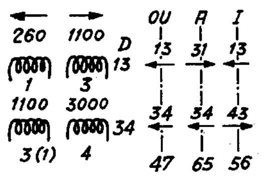
Figure 20:
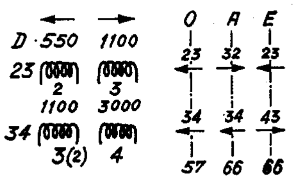
Figure 21:
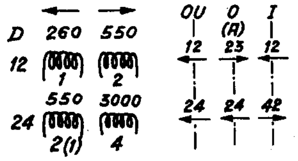
Figure 22:
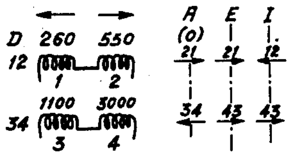
Figure 23:
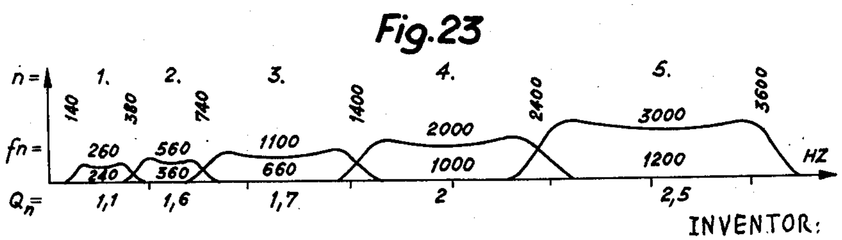
Figure 24:
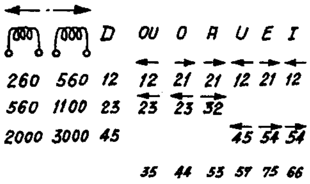
Figure 25:
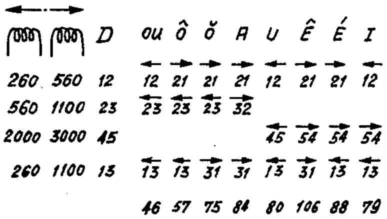
Figure 26:
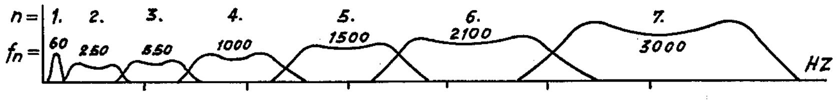
Figure 27:
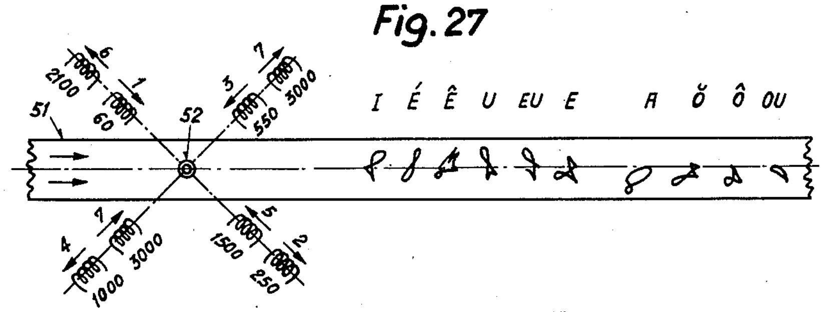
Figure 29:
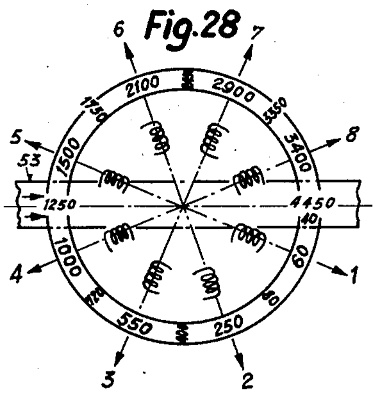
Figures 30, 31, 32, 33, 34:
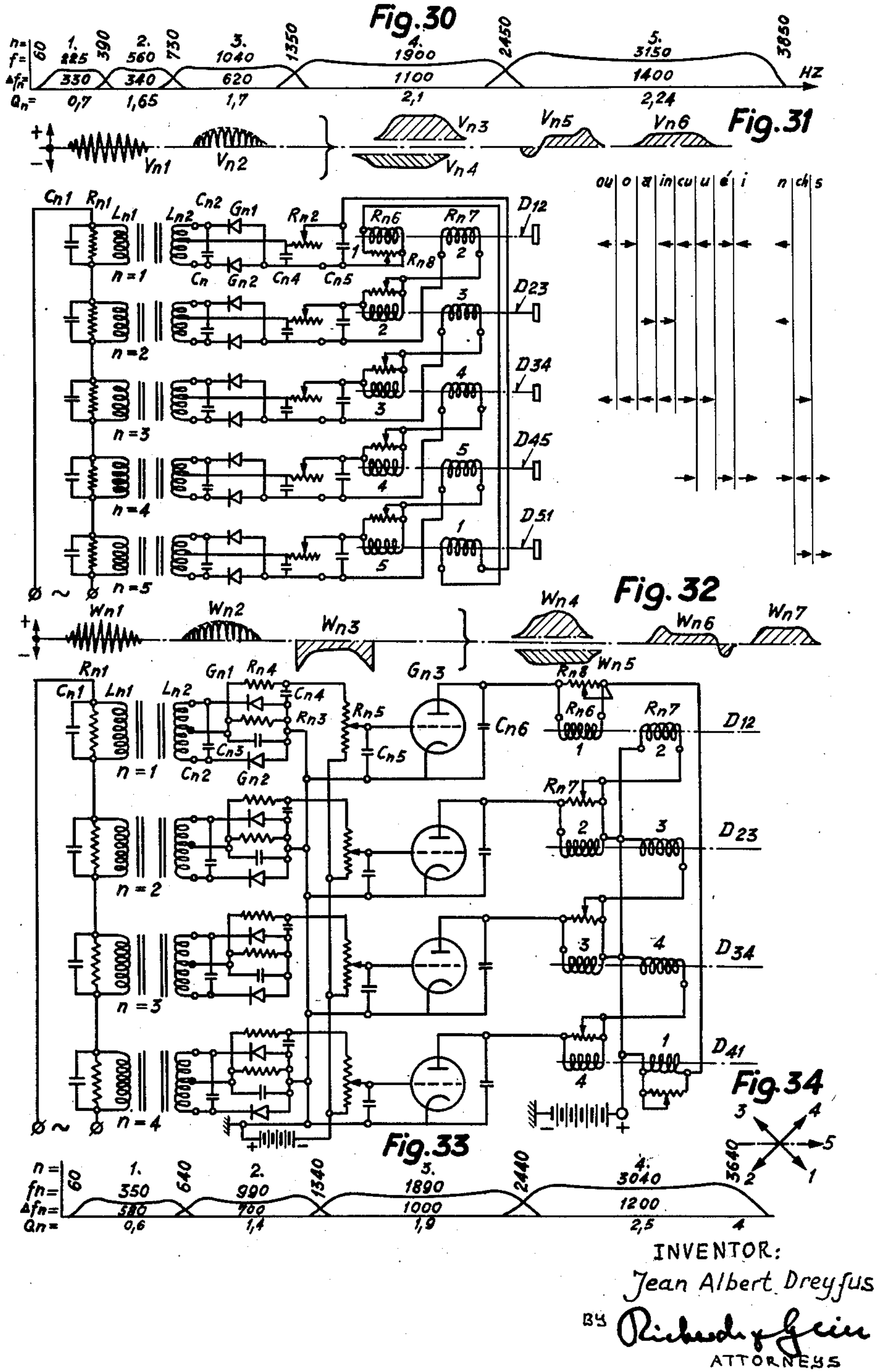

Figure 13 indicates the corresponding current oscillations and variations;

Figure 14 shows the frequency bands;

Figure 15 is a table of combinations;

Figure 16 shows the characteristics of an electronic tube corresponding to Figure 12;

Figures 17 and 18 show modifications of the relays of Figure 12;

Figures 19 to 22 show tables of combinations using a part of the frequency bands of Figure 14, being limited to the differentiation of three vowels;

Figure 23 shows five frequency bands permitting six or eight vowels to be differentiated according to the combination tables of Figures 24 and 25;

Figure 26 indicates seven bands of frequencies;

Figure 27 shows the star connection of the corresponding steno-sonographic coils;

Figure 28 shows the star connection of eight components;

Figure 29 shows several practical values corresponding to the diagrams such as that of Figure 5;

Figure 30 indicates 5 bands of frequencies;

Figures 31 and 32 show simplified diagrams for the differentiation of a limited number of vowels pronounced separately;

Figures 33 and 34 show four components;

Figures 35 to 38 show phonetic steno-sonograms with two and with four components;

Figures 39 to 43 show in elevation and in section an improved two-dimensional oscillograph adapted to work with a steno-sonograph with six components.

Figure 1:
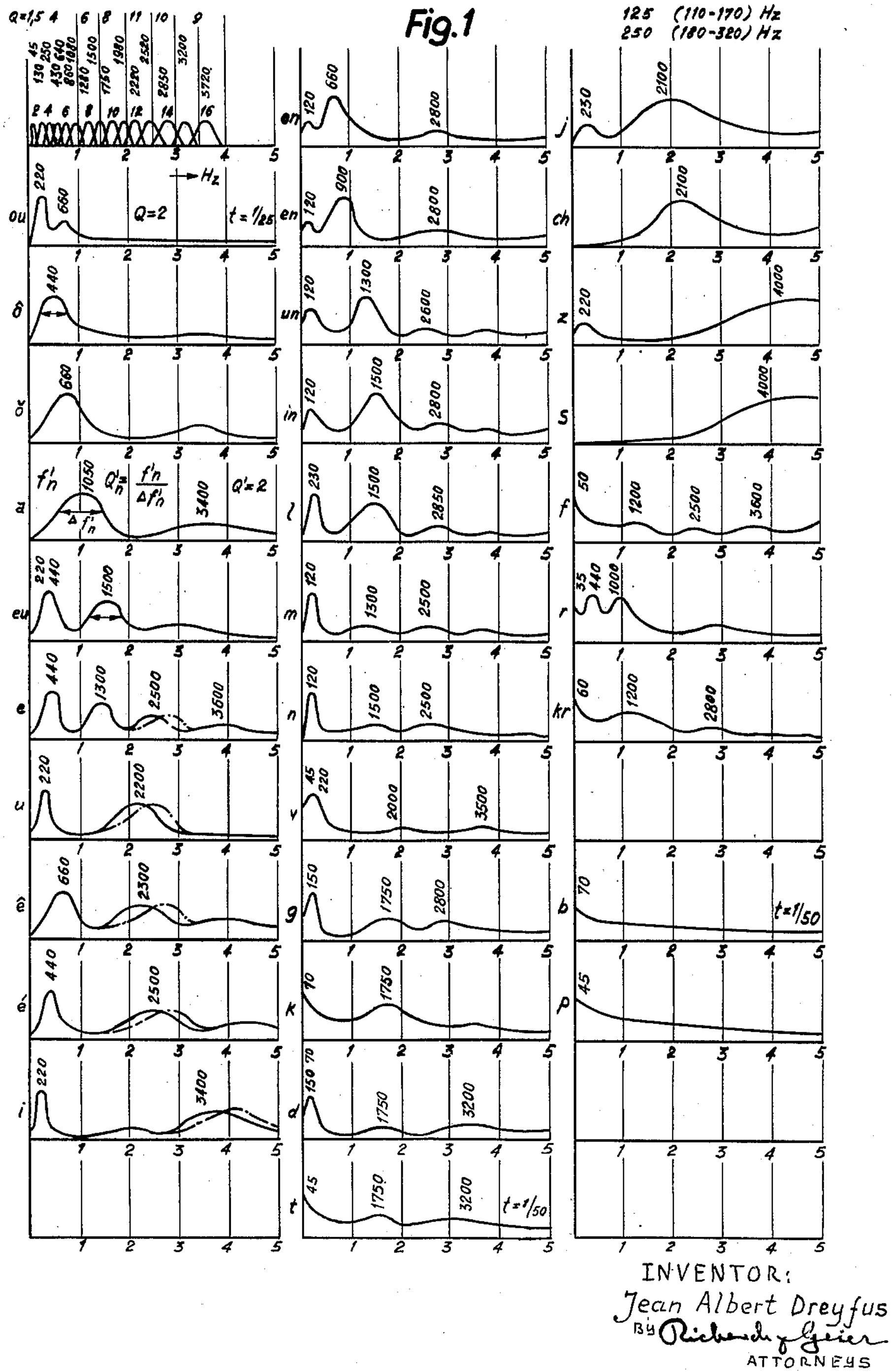

Figure 1 shows the acoustic frequency spectra of the initial transient part of wave trains constituting the main phonetic elements or phenomes of the French language. It will be noted that for frequencies between 400 and 4,000 cycles per second, the relative band width $Q^1$ of the sounds emitted increases approximately between 1.5 and 3. See also a publication of the author in the "Helvetica Physica Acta," volume XIX, Fasc. 6–7 (1946), entitled "On the transient spectra of phonetic elements (sonographic analysis) according to the report of communications to the Meeting of the Swiss Physical Society" of the 8th September 1948 in Zurich.

On the other hand, the band of 90 to 390 cycles per second can hardly be subdivided, because the pitch of the voice of the speaker can vary normally between these limits, in such a manner that the width of the relative band may be $$f_n:\Delta f_n=240;\ 300=0.8=Q_n,$$

where $$f_n=(390+90):2=240,\text{ and }\Delta f_n=390-90=300$$

cycles per second. There still exists a band comprised between 40 and 80 cycles per second which can help to characterize the stopped consonants such as *b* and *p*. Experimental researches of the author have shown that the characteristic border lines between *ou* and *o*, *o* and *a*, *a* and *un*, *un* and *u*, *u* and *i*, are found near 389, 720, 1260, 1750 and 2500 cycles per second.

In consequence, the transient phonetic frequency spectra may be broken up into eight frequency bands, of which the mean frequencies $f_n$ and the border line frequencies $f_n$, $n+1$ are as follows:

| $n$ | 0 | 1 | 2 | 3 | 4 | 5 | 6 | 7 | 8 | |
|---|---|---|---|---|---|---|---|---|---|---|
| $f_n$ | | 60 | 230 | 550 | 1000 | 1500 | 2150 | 3000 | 4000 | hz |
| $f_n, n+1$ | 40 | 80 | 380 | 720 | 1250 | 1800 | 2500 | 3400 | 4600 | hz |
| $\Delta f_n$ | | 40 | 300 | 340 | 530 | 550 | 700 | 900 | 1200 | hz |
| $Q_n$ | | 1.5 | 0.77 | 1.6 | 1.9 | 2.7 | 3 | 3.3 | 3.4 | |

Bands 1 and 8 can often be passed and occasionally other bands in the cases of simplified breaking up.

Figure 2:
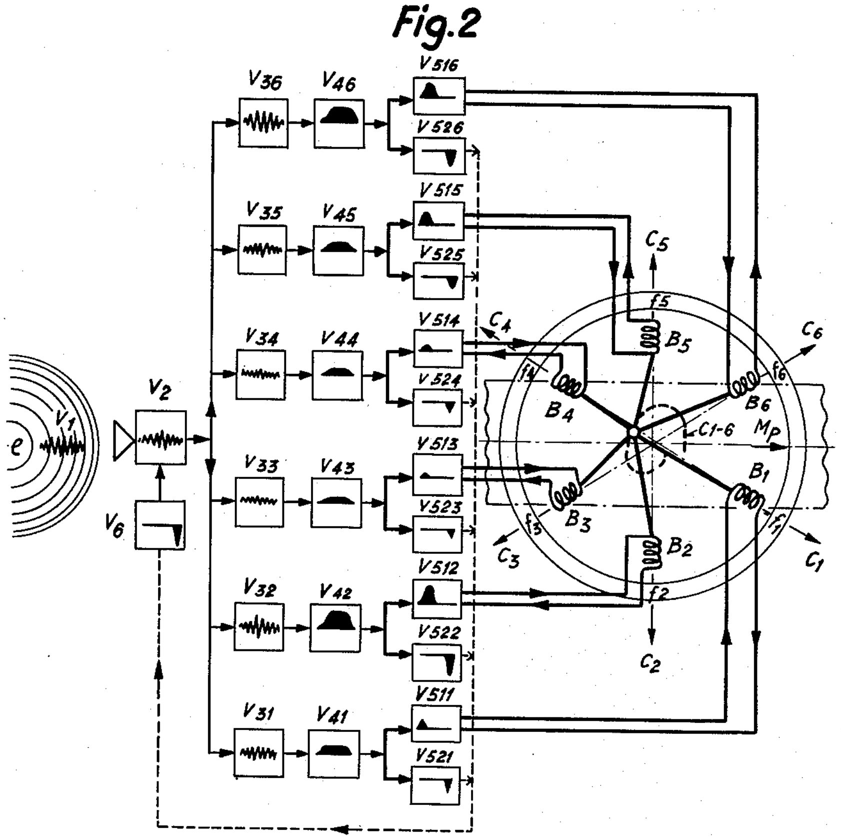
Figure 3:
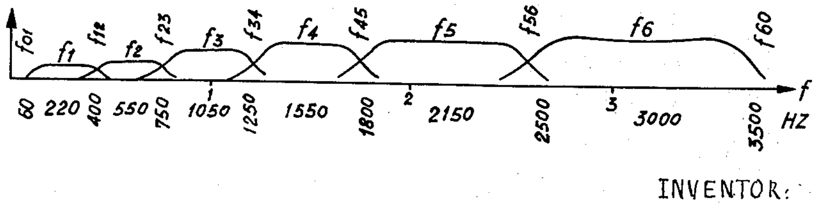

Figure 2 shows a diagram of the principle of a phonetic steno-sonograph with six components, the frequency bands of which are indicated by Figure 3.

The train of acoustic waves $V_1$ constituting, for example, the sound of the vowel *e*, is transformed into a microphonic oscillation $V_2$ by means of a microphone and a compensated amplifier. This microphonic oscillation $V_2$ is transformed into six partial oscillations $V_{31}$ to $V_{36}$ by means of a frequency analyser comprising six band filters, the mean frequencies and the border line frequencies of which are indicated in Figure 3. These six partial oscillations are transformed into six variations of rectified current (or part energy variations) $V_{41}$ to $V_{46}$ by means of six full-wave rectifiers followed by six low-pass filters. The time constants of these circuits are selected in such a manner that the variations of the rectified current reproduce the envelope of the transient parts of the wave train. Thus, these time constants may, in the phonetic case, be of the order of 5 milli-seconds which would permit of the elimination of acoustic frequencies higher than 100 cycles per second and the selection of the transient variations.

Each variation of rectified current thus presents an initial transient part and a final transient part between which there is sometimes found (in long vowels) a quasi-stationary part. These variations of rectified current $V_{41}$ to $V_{46}$ are transformed into six initial impulses $V_{521}$ to $V_{526}$ with the aid of circuits which differentiate between increasing and decreasing variations of the rectified currents. These circuits may comprise coupling condensers and oppositely-connected rectifiers, the initial impulses being positive and the final impulses negative, for example.

The six initial impulses $V_{511}$ to $V_{516}$ pass through the six star-connected coils $B_1$ to $B_6$, of a two-dimensional oscillograph and their resultants have for combined differential effect to cause a scriber to describe a graph $C_{1-6}$ which is recorded by a sheet of paper, this latter being, for example, given a translatory movement $M_p$.

This graph or sonogram can serve either as a differential spectrogram, utilising polar coordinates or it can act as a codifiable or alphabetic symbol.

The resultant $V_6$ of the final impulses, such as $V_{521}$ to $V_{526}$ may serve to restore to zero the microphonic oscillation $V_2$ in the amplifier, so as to render the following wave train independent of the preceding one. This can be effected with the aid of a release oscillator which supplies a very brief negative impulse (of a few milliseconds) to the grid of an amplifier valve, each time it receives a final resultant $V_6$.

Figure 4:
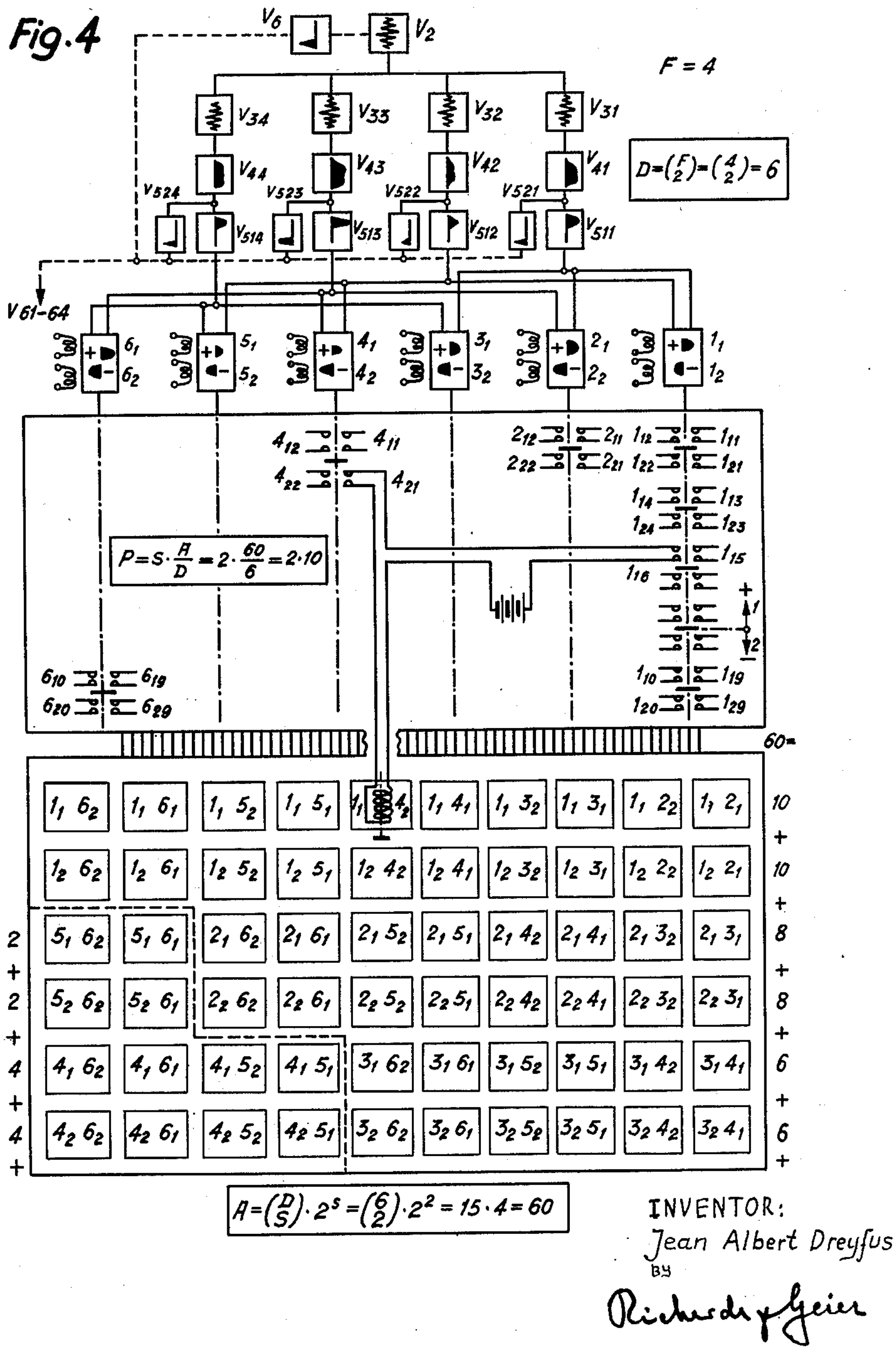

Figure 4 is a diagram showing the principle of a theoretical phonetic typo-sonograph with $n=4$ components. The generator of the initial and final impulses is similar to that of Figure 2, but the two dimensional oscillograph is replaced by a relay combiner and integrator. The $n$ initial impulses, such as $V_{511}$ to $V_{514}$ can be differentiated two at a time up to a maximum number of $$D=\binom{n}{2}$$

such as $$\binom{4}{2}=6$$

such as $1_1 1_2$ to $6_1 6_2$. A typewriter key may be released by an impulse relay such as $1_1 4_2$, each time a number S of series-connected contacts, such as two contacts $1_{16}$ and $4_{21}$ are closed simultaneously by as many different differential relays, such as $1_1 1_2$ and $4_1 4_2$.

The maximum number A of impulse relays which can be released by the aid of D differential relays and S contacts in series is $$A=\binom{D}{S}\cdot 2^S$$

such as $$A=\binom{6}{2}\cdot 2^2=15\cdot 4=60$$

such as $1_1 2_1$ to $5_2 6_2$.

The maximum number P of pairs of contacts for the differential relays is $P=S\cdot A:D$, such as $P=2\cdot 60:6=2\cdot 10=20$, such as $1_{11}$ to $1_{20}$ or $6_{11}$ to $6_{20}$.

By way of example, the table below indicates the maximum number D of differential relays as a function of the number $n$ of components (initial impulses and band filters) comprised between 2 and 10:

| | | | | | | | | | |
|---|---|---|---|---|---|---|---|---|---|
| $n$ | 2 | 3 | 4 | 5 | 6 | 7 | 8 | 9 | 10 |
| $D=\binom{n}{2}$ | 1 | 3 | 6 | 10 | 15 | 21 | 28 | 36 | 45 |

On the other hand, the table below indicates maximum numbers A of impulse relays (or of typographic keys) as a function of different numbers D of differential relays and numbers S of contacts in series:

| | D=2 | 3 | 4 | 5 | 6 | 7 | 8 | 9 | 10 | 15 | 28 |
|---|---|---|---|---|---|---|---|---|---|---|---|
| S=2; $A=\binom{D}{S}\cdot 2^S$ | A=4 | 12 | 24 | 40 | 60 | 84 | 112 | 144 | 180 | 420 | 1512 |
| 3 | A= | 8 | 32 | 80 | 160 | 260 | 448 | 672 | 960 | 2640 | 26208 |
| 4 | A= | | 16 | 80 | 240 | 650 | 1120 | 2016 | 3360 | 21840 | 343600 |
| 10 | A= | | | | | | | | 1024 | | $20.10^9$ |

These figures obviously only have significance in so far as theoretical limit values are concerned.

All the combinations of differential relays and of contacts in series are not practicable. It is necessary on the contrary to select the corresponding combination, for each phoneme, in accordance with the "formants" or characteristic frequency bands of the latter. This condition restricts considerably the practicable combinations as will be described later.

Figure 5 shows the electrical circuit of a sonograph with $n=7$ components the frequency bands of which are shown in Figure 6.

The microphonic oscillation furnished by the microphone $M_1$ is amplified by the valves $E_1$, $E_2$. The anode circuit of $E_2$ comprises a series of 7 band filters $n=1$ to $n=7$ which break up the microphonic oscillation into 7 partial oscillations such as $O_1$. The latter comprises a transient part of duration $t_1$, a final transient part of duration $t_3$ and sometimes a quasi-stationary part of duration $t_2$. The durations $t_1$ of phonemes are usually of the order of 5 to 50 milliseconds. The duration $t_2$ may vary between 0 ms. for the stopped consonants and several seconds for the very long vowels.

Each band filter comprises a transformer with two separate inductive windings $L_{n1}$ and $L_{n2}$ which are tuned by the condensers $C_{n1}$ and $C_{n2}$. Variable resistances $R_{n1}$ and $R_{n2}$ allow the damping coefficient to be adjusted. The coupling between $L_{m1}$ and $L_{n2}$ is variable.

The secondary of each tuned transformer is connected with two full-wave rectifier circuits, comprising the resistances $R_{n3}$, $R_{n4}$, the condensers $C_{n3}$, $C_{n4}$ and the rectifiers (such as crystal diodes) $G_{n1}$, $G_{n2}$.

Each rectifier circuit is followed by a low-pass filter with the resistances $R_{n5}$, $R_{n6}$ and the condensers $C_{n5}$, $C_{n6}$. The time constants $R_n\cdot C_n=T_n$ of these circuits are comprised between about 2 and 50 ms. $T_1$ can be made equal to 5 ms. for the stopped consonants, and $T_2$ to $T_7$ can be between 10 and 20 ms. for the other phonemes.

Thus the partial oscillations, such as $O_1$, are transformed into variations of two opposite rectified currents (or partial energy variations), such as $O_2$ and $O_3$, the positive and negative potentials of which appear at the terminals of the resistances $R_{n5}$ and $R_{n6}$.

The coupling condensers $C_{n7}$, $C_{n8}$, $C_{n9}$ select the transient parts (increasing and decreasing) of these variations and these appear as transient impulses (initial and final) $O_4$ to $O_7$ at the terminals of the resistances $R_{n10}$ to $R_{n12}$, which latter are shunted by the condensers $C_{n10}$ to $C_{n12}$ and form other cells of low pass filters. Thus, the quasi-stationary parts of the variations of rectified current are eliminated.

The rectifier $G_{n3}$ and the variable resistance $R_{n13}$ select the initial positive impulse $O_4$ which becomes $O_8$, while eliminating $O_5$. The rectifier $G_{n4}$ acting in the opposite direction, selects the final negative impulse $O_5$, which becomes $O_9$, while eliminating $O_4$. The rectifier $G_{n5}$ selects the initial negative impulse $O_6$, which becomes $O_{10}$, while eliminating the final positive impulse $O_7$.

The initial positive impulses $O_8$, filtered by the condensers $C_{n13}$, $C_{n16}$ are amplified by valves $E_{n1}$, the anode currents of which are practically zero in the absence of impulses (class C), and they pass through the differential magneto-motive coils $B_{11}$ to $B_{71}$, which, may for example, be those of two dimensional oscillographs or of the differential relays indicated in Figures 2 and 4. The latter are selective of the duration of the impulses, acting either as mechanical resonators for a sub-acoustic frequency of between about 20 and 10 cycles, or for sub-acoustic frequencies included between 30 and 5 cycles per second, which are selected by electrical filters associated with these relays. It is thus possible economically to differentiate plosive phonemes, for example. A suitable resultant of the final negative impulses $O_9$ may serve to release a brief negative impulse (2 to 10 ms.) with the aid of an oscillator $E_4$, thus stopping the microphonic oscillation, by acting on the grid of the valve $E_2$. This allows the syllables to be broken up into phonemes.

A suitable resultant of the initial negative impulses $O_{10}$ may either serve to compensate for the undesirable variations of intensity of the wave trains or to repeat the impulses in the case of quasi-stationary parts exceeding a certain duration. That resultant may act on the grid of the valve $E_1$ by the intermediary of an electronic valve device $E_5$. The devices $E_4$ and $E_5$ may be similar to those which are known either for relaxation oscillators or for automatic volume control.

Figures 7 and 8 indicate diagrammatically in elevation and in section a transformer adapted to be used with the band filters $n=1$ to $n=7$. The primary and secondary windings 1 and 2 are wound on bundles of sheet metal 3 and 4 which are arranged symmetrically on opposite sides of an air gap the width of which is variable in such a manner as to vary the coupling coefficient between, for example, 0.98 and 0.2. Thus, the width of the band passed can be adjusted within very wide limits.

Figure 9 is a diagrammatic sectional view of an electro-dynamic differential relay which can comprise two windings such as $B_{11}$, $B_{21}$ (Figure 5). These windings are wound in a movable coil 8, which is suspended in the air gap of a permanent magnet 9 by a system of blade springs such as 10, which are located in a plane normal to the direction of movement of the movable coil 8. Accordingly, as the impulses such as $O_8$ are stronger in one winding than in the other, contacts such as 11, 12 or 13, 14 will be closed. In contradistinction to the usual electro-magnetic relays, this device permits differential effects, whether they occur simultaneously or out of phase with each other, to be reproduced faithfully. The time of response of these relays may be varied between 0.1 and several milli-seconds. Condensers $C_{n15}$, $C_{n16}$ may serve either to compensate for or to produce relative phase displacements between the impulses.

Figures 10 and 11 give a table of combinations of a phonetic typo-sonograph with 7 components $n=0$ to $n=6$, which comprises 16 differential relays $D_{01}$ to $D_{56}$ and 32 typographical keys corresponding to these phonemes, each of these keys being adapted to be released by the series of 3 to 4 contacts. For example, the contact ô will be released by the simultaneous closing of 3 contacts 21, 13, 34 operated by the 3 differential relays $D_{12}$, $D_{13}$, $D_{34}$. (The inversion of the numbers of a differential relay indicates the inversion of the closing of the latter.)

Thus, out of the maximum number $D=21$ of the possible differential relays for 7 components, it is possible to choose only 16, and out of the maximum possible number A, which is more than 2,000, of operating relays only 32 are required.

Figures 12 to 35 indicate the electrical diagrams and the frequency bands of phonetic typo-sonographs which are restricted to be controlled by certain vowels (sonographs of vowels) to the number of 5 or 3 or 6 or 8.

According to Figure 12, the oscillation supplied by the microphone 21 is amplified by a compensated amplifier 22, then broken up into 4 partial oscillations, such as $V_{11}$, $V_{12}$ in Figure 13, with the aid of 4 band filters $n=1$ to $n=4$, the pass bands of which are indicated in Figure 14. Circuits comprising the rectifiers $G_{11}$ to $G_{14}$, the resistances $R_{41}$ to $R_{44}$ and the condensers $C_{41}$ to $C_{44}$ and the low-pass filters formed by the resistances $R_{51}$ to $R_{54}$ shunted by the condensers $C_{51}$ to $C_{54}$, provide 4 variations of the rectified current, such as $V_{21}$, $V_{22}$. The latter are transformed into initial and final impulses such as $V_{31}$, $V_{41}$ and $V_{32}$, $V_{42}$ by the coupling condensers $C_{61}$ to $C_{64}$ and the variable resistances $R_{71}$ to $R_{74}$. The rectifier valves $G_{21}$ to $G_{24}$, the characteristics of which are indicated on Figure 16, select and amplify the initial impulses such as $V_{51}$, $V_{52}$. The three differential relays $D_{12}$, $D_{23}$, $D_{34}$ respond to differences in the impulses arising from successive components arranged in the order of the frequency bands. Each vowel circuit such as *Ou*, O, A, E, I is closed when two contacts in series arranged on two different differential relays are closed simultaneously under the effect of the corresponding vowel pronounced in front of the microphone 21. The directional combinations of the differential relays are indicated in Figure 15.

The time constants of the circuits described may be selected between 20 and 100 milli-seconds. For large time constants a spoken word will only act through the vowel which it contains. It will, for example, make no difference whether the vowels E, O, I, A are pronounced or the word "Veronica."

According to Figure 17, each double-wound differential polarised relay, such as $D_{12}$, may be replaced by simple two-winding relays.

According to Figure 18, each differential two-winding relay can be replaced by a polarised relay having a single winding by making use of bridge circuits comprising rectifiers such as $G_{15}$, $G_{16}$, $G_{25}$, $G_{26}$.

Figures 19 to 22 indicate tables of combinations of differential impulses similar to those of Figures 12 and 15, but simplified so as only to respond to 3 vowels, such as OU, A, I or O, A, E, or OU, O, I. To this end it may be sufficient to provide three filter bands, such as $n=1$, 3, 4 or 2, 3, 4, and two differential relays, such as $D_{13}$, $D_{34}$ (OU, A, I) or $D_{23}$, $D_{34}$ (O, A, E), to differentiate different vowels.

Figure 23 indicates five pass bands and Figure 24 shows the corresponding combinations of three differential relays $D_{12}$, $D_{23}$, $D_{45}$, allowing the six vowels OU, O, A, U, E, I to be differentiated with the aid of a series of two contacts.

Figure 25 indicates the combination of four differential relays which, with the aid of the five pass bands in Figure 23 and a series of three contacts, permit of the eight vowels OU, Ô, Õ, A, U, Ê, É, I being differentiated.

Figures 26 and 27 indicate the seven pass bands and the cross-connection of seven two dimensional oscillograph magneto-motive coils which permit of the provision of a phonetic steno-sonograph having seven components, as well as certain graphic categories adapted to be produced by the printer 52 on the paper 51. The printer may be ink, electro-chemical, thermo-electric or it may operate according to any other method of direct inscription. It may also be replaced by a method of photographic inscription using a special cathode ray oscillograph having seven components.

In like manner, Figure 28 shows the arrangement in an octagonal star form of a phonetic steno-sonograph with eight components.

Figure 29 indicates several practical values corresponding to the electrical diagram of Figure 5.

Figure 31 shows an electro-acoustic device similar to that of Figure 25, but limited to the use of vowels or long consonants pronounced separately, with intermediate silences. In these conditions, the apparatus may be simplified and electronic valves may be omitted. It may be called a sonograph for spelt vowels. It comprises 5 filter bands the resonance curves of which are indicated in Figure 30. Conductive couplings may be provided using variable resistances $R_{n5}$, or use may be made of capacitative couplings with a high time constant (100 ms.). In spite of the simplicity of the apparatus, there can be differentiated, under particular conditions of pronunciation, vowels suc has OU, O, A, IN, EU, U, É, I using only five differential relays $D_{12}$ to $D_{51}$. The variations of the rectified current $V_{n2}$ are not differentiated in time, but only in space. Phase displacements between two differentiated variations such as $V_{n3}$, $V_{n4}$ the difference of which is $V_{n4}$ may be compensated for by the use of condensers $C_{n5}$ giving $V_{n6}$ as the difference.

In order to obtain a greater control energy, but for a more limited number of spelt vowels, the circuit of Figure 32 can be utilised, this comprising four filters, the bands of which are indicated in Figure 33, and four differential relays $D_{12}$ to $D_{41}$. Thus, a partial oscillation such as $W_{n1}$, is transformed into $W_{n2}$, then into $W_{n3}$ and $W_{n4}$ by means of rectifying and amplifying electronic valves $G_{n3}$. The phase differences $W_{n6}$ (or $W_{n7}$ when synchronized with the aid of condensers $C_{n5}$, $C_{n6}$) between two impulses $W_{n4}$, $W_{n5}$ operates a differential relay such as $D_{12}$.

The four filters the bands of which are indicated by Figure 33 may operate a two-dimensional oscillograph having four cross-connected components 1 to 4 as shown in Figure 34. The movement of the paper is effected in the direction of the bisecting line 5. The components are differentiated in time with the aid of a circuit similar to that of Figure 5.

For the registration of sounds other than specifically phonetic sounds, there can be used a number $n$ of band filters which is other than those indicated. For example, there may be utilized mean frequencies $f_n$, the ratio of two successive mean frequencies being a constant ratio $$K=\frac{f_n+1}{f_n}$$

and the relative width of the band $Q_n$ being $$Q_n=\frac{K+1}{K-1}$$

The ratio K may be chosen equal to a fraction of a whole number such as 5/3=1.665.=a large sixth, 8/5=1.6=a small sixth, 3/2=1.5=a fifth, 4/3=1.33=quarter. 5/4=1.25=a third. or finally 16/15=1.065=a major semi-tone. It is thus possible to reproduce the characters of musical or other sounds. In a general manner. the width of the relative band $Q_n$ of the sonographic receiver will be of the same order of size as that $Q^1_n$ of the sound emitter.

It is possible to eliminate the phonemeographic and detector effect, for example, the pitch of voice or the emotion of a speaker using a steno-sonograph with four cross-connected components, the four frequency bands being comprised between 100 and 400 cycles per second.

A universal sonograph may be constructed permitting the components in the frequencies to be varied both as regards their time constants and their combinations utilising a mulitple commutator.

Figure 35:
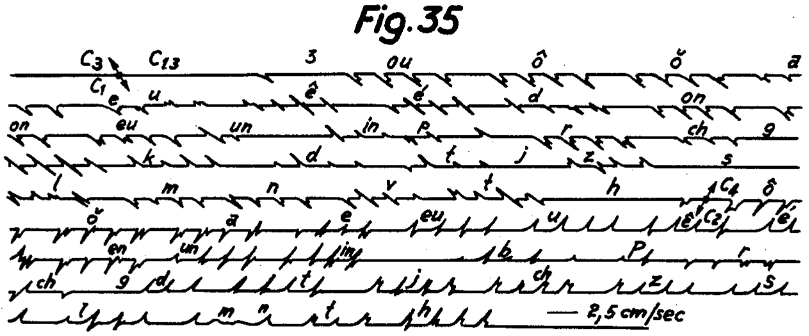
Figure 36:
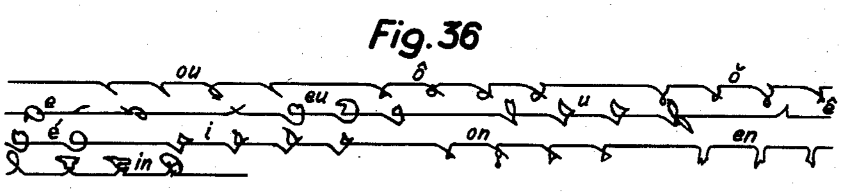
Figure 37:
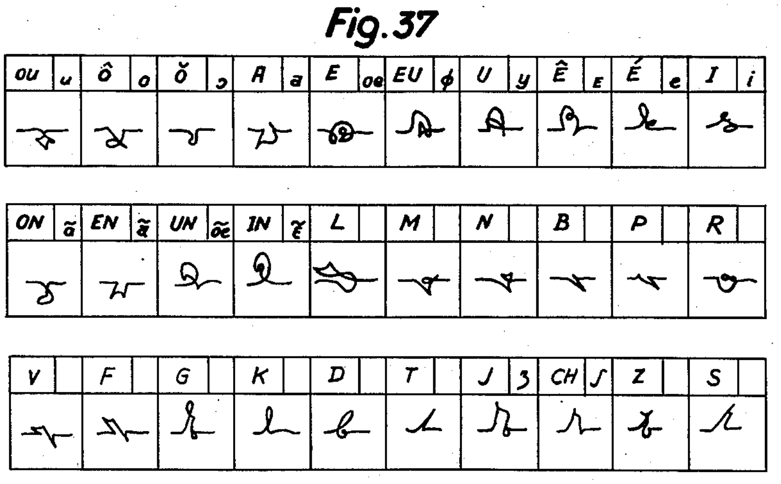
Figure 38:
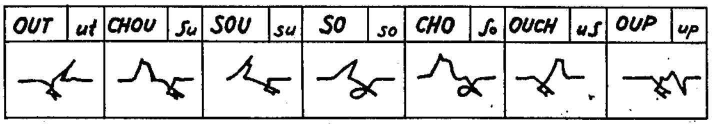
Figures 39, 40, 41, 42, 43:
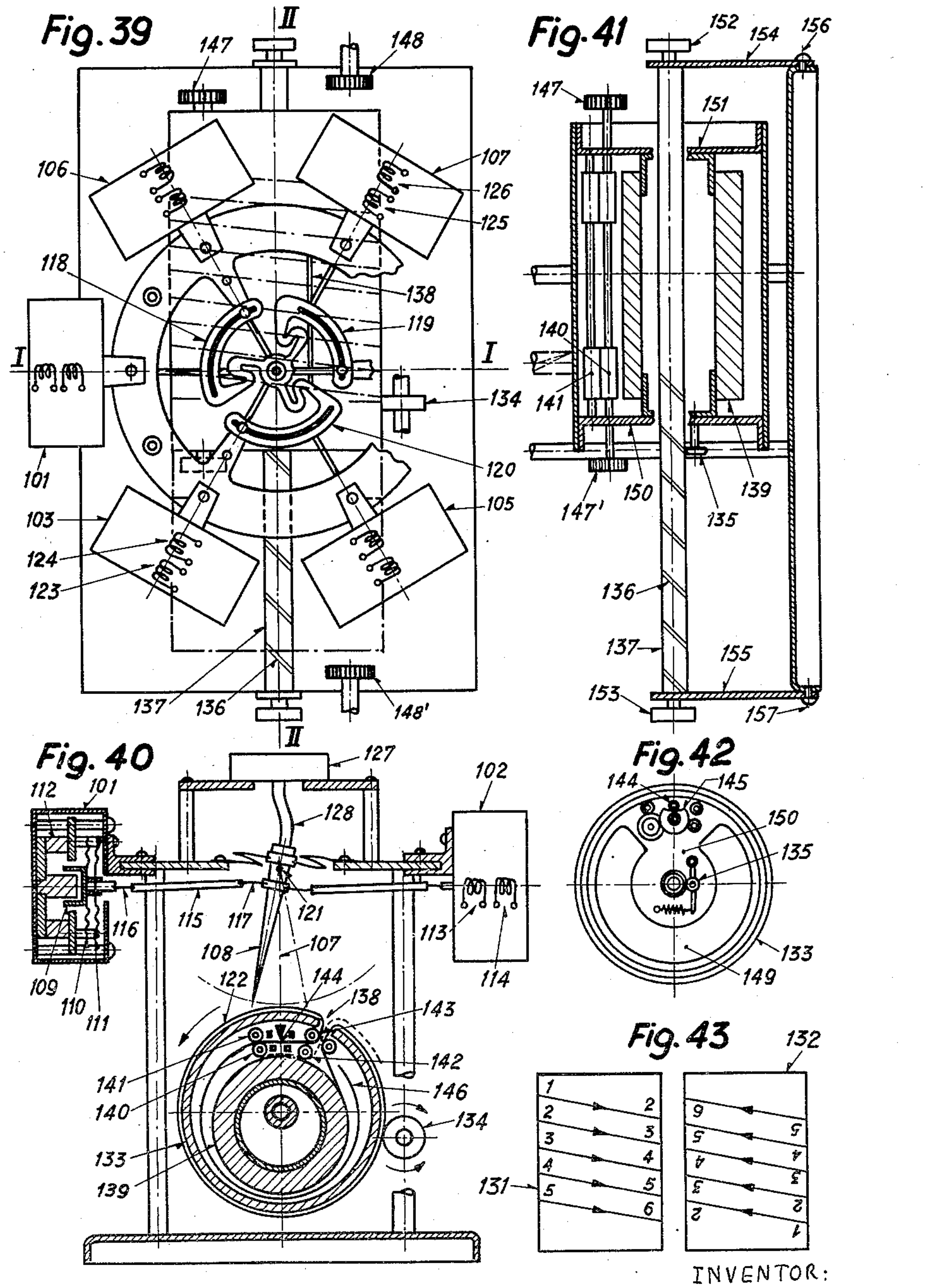

Figures 35 to 38 show several phonemeograms recorded with the aid of a steno-sonograph having four cross-connected components as shown in Figures 33, 34. Figure 35 gives the differential spectrograms resulting from two diametral components 1—3 and 2—4. Figure 36 shows phonemeograms with four phoneme components 1 to 4 repeated four times with the voice pitch varied between 100 and 250 cycles per second. Figure 37 shows a kind of steno-sonographic alphabet. which is one out of an unlimited number of possibilities. Figure 38 reproduces several syllables.

Figures 39 to 43 indicate the improved mechanical construction of a steno-sonograph with six components corresponding to a part of Figure 2, the needle being suspended by a resilient ball and socket joint and the paper being automatically replaced.

The apparatus comprises a certain number $n$ of pairs of electro-dynamic motors, such as 101 and 102, 103 and 104, 105 and 106 arranged regularly in star form around the shaft 107 of the recording index 108. The number $n$ may be 2, 3, 4, 5 etc. Each pair comprises two motors, such as 101 and 102, which are diametrically opposed. The angle included between the axes are 360°:2$n$. In the present construction, there are three pairs of motors, that is to say, six motors in all, and the angles are 60°.

Each motor, such as 101, comprises a movable coil 109 suspended by a spring system such as 110, 111 in the air gap of a permanent magnet 112. Each movable coil comprises two windings such as 113, 114. When a winding 113 is traversed by an electric current oscillation, of an acoustic or sub-acoustic frequency, the coil 109 executes translatory vibrations of an amplitude $a$. These vibrations are transmitted to the index 108 by means of rigid rods 115 and flexible steel wires 116, 117 forming ball-joints which are free of play or wear. The needle is suspended by a system of curved blade springs 118 to 120 which constitute a resilient axial bearing. This ball joint keeps the point of rotation 121 of the needle 108 in the axis 107, while permitting the point of rotation 121 to be moved resiliently along this axis. Thus, the translatory vibrations of the coils, such as 109, are transformed into amplified vibrations of the point of the needle 108 which may follow a curve of the recording paper 122, while exerting a certain pressure on the latter.

The blade springs supporting the needle are situated. when at rest, in a plane normal to the axis of the needle. Each blade may comprise a certain number of sectors and annular segments.

The suspension of the movable coil 109 may comprise two parallel systems 101. 111 consisting of blade springs similar to 118 to 120. The blades may be arranged regularly in star form, to the number of 3, 4, 5, 6, etc.

In order to balance the drive of the needle 108 dynamically two pairs of diametrically opposed windings such as 123. 125 or 124, 126 may be traversed in series or in parallel by the same electric current oscillation.

In the example described, the twelve pairs of windings such as 123, 124, may be traversed by six different electric current oscillations, simultaneously or out of phase. Thus, the needle 108 describes two dimensional graphs which faithfully reproduce the resultant effect of six components.

The needle 108 may be hollow and serve as an ink channel. the ink being conducted from the reservoir 127 by the flexible tube 128. The point of rotation 121 being in the neighbourhood of the connection between the needle 108 and the flexible tube 128. the latter does not interfere with the movements of the needle. The needle may contain a flexible metallic wire closing or opening the point of the vibrating needle automatically.

The recording paper 131 may be of rectangular form and is wrapped round the rigid cylinder 133. This cylinder may be driven with a rotary movement, which is communicated to it frictionally by the driving wheel 134, and with a translatory movement communicated to it by the wheel 135 which is engaged in a helical groove 136 in the rigid shaft 137. Considered in relation to the point of the needle 108 when at rest, the projection of the needle describes a helical line on the paper. When the sheet of paper 122 is opened out this line is presented in the form of a succession of inclined and parallel lines such 1—2, 2—3 . . . 5—6, in Figure 43.

A device may be provided for automatically replacing the sheet of paper, thus permitting uninterrupted recording over a period lasting several tens of hours, the recording being started again on a succession of sheets of standard sizes.

To this end, the cylinder 133 is provided with an axial slot 138 the length of which is the same as the length of the sheet of paper 131 and the width of which is a fraction of a millimetre. A roll of paper 139 adapted to furnish the material for several hundreds or thousands of sheets of paper is arranged in the interior of the cylinder 133. The end of the paper 122 passes out through the slot 138, makes a complete turn around the cylinder 133, re-enters through the same slot, passes around two pairs of driving rollers 140 to 143 and again makes a complete turn in the space between the cylinder 133 and the paper roller 139. A knife 144 operated by the cam 145 cuts the paper and frees the end 146 after recording.

The automatic replacement operation is as follows. The needle 108 having covered the graph sheet or section 122, the toothed wheel 147 or 147[1] engages against a toothed driving wheel 148 or 148[1]. The rollers 140 to 143 cause the paper to advance through a distance corresponding to the width of a section in a direction opposite to the latter which is communicated to the periphery of the cylinder 133 by a driving wheel 134. Simultaneously, a commutator reverse the electric supply to the electro-dynamic motors 101 to 106. Thereafter, the section of the paper is replaced by the following section, the direction of rotation of the driving wheel 134 is reversed and the cylinder returns in the reverse direction to its starting position. The inscription of the first section is made on the lines 1—2 to 5—6 of the sheet 131. That of the following section according to the reverse lines 6—7 to 10—11 of the sheet 132. The inscription of each first line of a sheet 131 or 132 is effected while the cylinder 133 has stopped and the paper is moving relatively to the cylinder and to the point of the needle at a speed equal to the peripheral speed of the cylinder. It would also be possible to make use of differences between the peripheral speeds of the cylinder of the paper.

As a result, an interrupted recording is obtained on a succession of standard sheets of paper, the knife 144 automatically liberating the finished sheet, which can be drawn back through the circular opening 149 formed in the walls 150, 151 of the cylinder 133.

In order to replace the paper roller 139 the screws 152, 153, may be loosened so that the support 154, 155 can be pivoted around the shafts 156, 157, thus enabling all the cylinder 133 and its contents to be withdrawn complete.

Blade springs such as 118 to 120 may include parts constituted by slotted annular segments. This permits the opposing force of the spring to be regulated by sliding the screws in the slots.

The mechanical characteristics of the oscillograph may be such that it faithfully reproduces the sub-acoustic frequencies included between about 5 and 50 cycles per second. This may be done by selecting the moment of inertia of the masses associated with the needle 108 and the degree of elasticity of the springs 110, 111 in such a manner that the mechanical resonance of the oscillograph is above 50 cycles per second. This mechanical resonance may be neutralised with the aid of anti-resonance electric filters.

The above mechanical conditions are easy to fulfill because the oscillograph normally reproduces sub-acoustic frequencies.

In a general manner, the device according to the invention, which is called a sonograph, is essentially an apparatus which transforms the acoustic frequencies of a sound into groups of impulses, of sub-acoustic frequencies, corresponding to transient parts of the sound. When, the mean of the acoustic frequencies of a phoneme is situated around 2,500 cycles per second, the corresponding sonographic frequency is about 25 cycles per second, or 100 times smaller. Thus, the movement of the recording paper of a steno-sonograph may be effected at a reduced speed somewhere between 5 and 1 cm./sec., on the average. Moreover, an electric printing machine capable of effecting 25 strokes per second is adequate. The feeding of the paper and the operation of the printer may be controlled by differential impulses. The advance of the paper may thus be effected between the times of recording.

I claim:

1. In an electro-acoustic apparatus for transforming successions of sounds into successions of mechanical movements, in combination with a microphone transforming successions of sounds into successions of electric microphonic oscillations, means connected with said microphone and having valves for amplifying said electric microphonic oscillations, a number of band filters connected with said means breaking up each amplified electric microphonic oscillation into the same number of partial oscillations, rectifier circuits connected with said band filters and comprising interconnected rectifiers, resistances and condensers, and transforming each partial oscillation into a rectified oscillation, and low-pass filters connected with said rectifier circuits and having interconnected resistances and condensers, and transforming rectified oscillations into current variations of infra-acoustic frequencies while suppressing acoustic frequencies; coupling condensers and resistances connected therewith, said coupling condensers producing at the terminals of the last-mentioned resistances increasing electric impulses and decreasing electric impulses opposed to said increasing electric impulses while suppressing quasi-stationary parts of the vibrations, other rectifier circuits connected with the last-mentioned resistances and comprising interconnected rectifiers, variable resistances and condensers, coils connected with said other rectifier circuits and receiving increasing electric impulses therefrom, said coils transforming said increasing electric impulses into mechanical impulse components, and yet other rectifier circuits connected in parallel with said other rectifier circuits and the grid of one of said amplifying valves and comprising interconnected rectifiers, variable resistances and condensers, and receiving decreasing electric impulses and controlling thereby the negative polarization of the grid of said one amplifying valve.

2. An electro-acoustic apparatus in accordance with claim 1, comprising further rectifier circuits connected to said band filters in parallel to the first-mentioned rectifier circuits and comprising interconnected rectifiers, resistances and condensers, and transforming oscillations into current variations opposed to said rectified oscillations, and other rectifying means connected with said further rectifier circuits and the grid of the other one of said amplifying valves and comprising interconnected coupling condensers, rectifiers and variable resistances, and transforming said current variations into increasing electric impulses controlling the grid polarization of said other amplifying valve.

3. An electro-acoustic apparatus in accordance with claim 1, comprising an auto-oscillator interposed between the last-mentioned rectifier circuits and the grid of said one amplifying valve, said decreasing electrical impulses commanding the rhythm of oscillations of said auto-oscillator.

4. An electro-acoustic apparatus in accordance with claim 1, wherein a separate pair of coils receives each increasing electric impulse, said increasing electric impulses being transformed into mechanical impulse components by said coils, and a movable relay armature connected with said pair and being subjected to a differential effect of the resultant of said components.

5. An electro-acoustic apparatus in accordance with claim 1, wherein a separate pair of coils receives each increasing electric impulse, said increasing electric impulses being transformed into mechanical impulse components by said coils, and a movable oscillograph armature connected with said pair and being subjected to a differential effect of the resultant of said components.

6. An electro-acoustic apparatus in accordance with claim 1, comprising two relays and wherein said coils constitute a part of said relays, each of the two relays having two coils, and a plurality of pairs of contacts disposed in series, said relays having movable armatures actuating said contacts, and means connecting said coils with said other rectifier circuits so that each increasing electric impulse will flow through two coils belonging to different relays.

7. An electro-acoustic apparatus in accordance with claim 1, wherein the number of said band filters is equal to three, and comprising two differential relays having movable armatures, and means connecting said coils with said movable armatures, whereby said mechanical impulse components actuate said armatures.

8. An electro-acoustic apparatus in accordance with claim 1, wherein the number of said band filters is equal to four, and comprising three differential relays having movable armatures, and means connecting said coils with said movable armatures, whereby said mechanical impulse components actuate said armatures.

9. An electro-acoustic apparatus in accordance with claim 1, wherein the number of said band filters is equal to the number of said increasing electric impulses, and comprising differential relays having movable armatures, and means connecting said coils with said movable armatures, whereby said mechanical impulse components actuate said armatures, the number of said relays being selected from the number of combinations possible from one-half of the number of band filters.

10. An electro-acoustic apparatus in accordance with claim 1, wherein said coils produce mechanical impulse components the number of which is equal to "$n$," and comprising differential relays, the number of said differential relays being selected from $$“D=\frac{n}{2}”$$

possible combinations, contacts in series upon said differential relays, action relays, and means operatively connecting said contacts with said action relays, the number of said action relays being selected from $$“A=\frac{D}{S}\times 2^S”$$

possible combinations, wherein "S" is the number of contacts in series for actuating an action relay.

11. An electro-acoustic apparatus in accordance with claim 1, wherein said coils consist of oscillograph coils having axes disposed in star formation, the number of said oscillograph coils being equal to that of said increasing electric impulses.

12. An electro-acoustic apparatus in accordance with claim 1, wherein said band filters comprise transformers having means constituting a variable air gap, sheet metal bundles disposed symmetrically on opposite sides of said air gap, and primary and secondary windings wound upon said bundles.

13. An electro-acoustic apparatus in accordance with claim 1, comprising a magnet having an air gap formed therein, and comprising means movably suspending said coils in said air gap.

14. An electro-acoustic apparatus in accordance with claim 1, comprising an oscillograph needle connected with said coils, and an elastic support consisting of springs in star formation for suspending said needle.

15. An electro-acoustic apparatus in accordance with claim 1, comprising relays connected with said coil, and typographic keys operatively connected with said relays.

16. Electro-acoustical apparatus according to claim 1, characterised by the fact that the $n$ band-pass filters include at least three filters, the limits of which are selected approximately within the following limits: 40 and 80, 100 and 380, 60 and 640, 380 and 720, 730 and 1300, 640 and 1350, 1300 and 1800, 1800 and 2500, 1400 and 2500, 2500 and 3500, 3500 and 4600 cycles per second.

17. Apparatus according to claim 1, characterised by the fact that the band-pass filters number 4 and that they limit approximately the following frequencies; about 60, 640, 1340, 2440, 3640 cycles per second.

18. Apparatus according to claim 1, characterised by the fact that the band-pass filters number 5 and that they limit approximately the following frequencies; 60, 390, 730, 1350, 2450, 3800 cycles per second.

19. Apparatus according to claim 1, characterised by the fact that the band-pass filters are of the number of 6 and that they limit the following approximate frequencies: 80, 380, 730, 1250, 1750, 2450, 3550 cycles per second.

20. Apparatus according to claim 1, characterised by the fact that the band-pass filters number 7 and that they limit approximately the following frequencies: 40, 80, 390, 720, 1300, 1800, 2500, 3600 cycles per second.

21. Apparatus according to claim 1, characterised by the fact that the band-pass filters number 8 and that they limit approximately the following frequencies: 40, 80, 380, 730, 1250, 1750, 2450, 3500, 4800 cycles per second.

22. Apparatus according to claim 1, characterised by the fact that the mean successive frequencies $f_n$ and $f_{n+1}$, of two adjacent band-pass filters are in a constant ratio $$K=\frac{f_n+1}{f_n}$$

which is approximately a fraction of a whole number greater than one, and that the width of the relative corresponding band is approximately $$Q_n=\frac{K+1}{K-1}$$

23. Apparatus according to claim 1, characterised by the fact that the ratio of two successive mean frequencies of two adjacent band filters is selected from one of the following values: sixth, fifth, a quarter, third, second, half-tone.

24. Apparatus according to claim 1, characterised by the fact that the time constants of the rectifier circuits and of the low-pass filters are between 2 and 15 ms.

25. Apparatus according to claim 1, characterised by the fact that the time constants of the rectifier circuits and of the low-pass filters are between 5 and 50 ms.

26. Apparaus according to claim 1, characterised by the fact that the time constants of the rectifier circuits and of the low-pass filters are between 10 and 100 ms.

JEAN ALBERT DREYFUS.

REFERENCES CITED

The following references are of record in the file of this patent:

UNITED STATES PATENTS

| Number | Name | Date |
|---|---|---|
| 1,801,657 | Buyko | Apr. 21, 1931 |
| 1,951,454 | Tiefenbacher | Mar. 30, 1934 |
| 2,137,888 | Fuller | Nov. 22, 1938 |
| 2,195,081 | Dudley | Mar. 26, 1940 |